United States Patent [19]

Van Heusden

[11] Patent Number: 4,473,864
[45] Date of Patent: Sep. 25, 1984

[54] ELECTROLYTIC CAPACITOR

[75] Inventor: Tineke Van Heusden, Eindhoven, Netherlands

[73] Assignee: U.S. Philips Corporation, New York, N.Y.

[21] Appl. No.: 528,375

[22] Filed: Sep. 1, 1983

[30] Foreign Application Priority Data

Sep. 24, 1982 [NL] Netherlands .......................... 8203708

[51] Int. Cl.$^3$ ........................... H01G 3/04; H01B 3/20
[52] U.S. Cl. ...................................... 361/327; 252/579
[58] Field of Search ....................... 252/567, 570, 579; 361/327, 314

[56] References Cited

U.S. PATENT DOCUMENTS

| | | | |
|---|---|---|---|
| 3,588,644 | 6/1971 | Nash et al. | 361/327 |
| 4,121,275 | 10/1978 | Ross et al. | 252/579 X |
| 4,290,926 | 9/1981 | Shaw | 252/579 |
| 4,347,169 | 8/1982 | Sato et al. | 361/327 X |
| 4,420,791 | 12/1983 | Shedigian | 252/570 X |

Primary Examiner—Donald A. Griffin
Attorney, Agent, or Firm—Norman N. Spain

[57] ABSTRACT

An electrolytic capacitor for use in the range from −55 to +125° C. with an liquid electrolyte consisting of a salt of a quaternary ammonium base and a dibasic organic acid, preferably having 6 to 10 carbon atoms dissolved in a dipolar organic solvent with 2-10% by weight of water. The liquid gives the capacitor an excellent forming behavior. High voltage and low voltage constructions of the capacitor are possible.

16 Claims, No Drawings

ELECTROLYTIC CAPACITOR

The invention relates to an electrolytic capacitor having a substantially non-aqueous electrolyte of high specific conductivity.

British Pat. No. 992,463 discloses an electrolytic capacitor which comprises an anode provided with a dielectric oxide layer by anodic oxidation, a cathode, a spacer and liquid electrolyte which comprises a salt of a substituted ammonium base and an organic acid dissolved in a dipolar organic solvent.

This type of liquid electrolyte makes the capacitor suitable for use in a very wide temperature range, namely from −55° to +125° C. The variation of the capacitance and of the series resistance remain within reasonable limits within this temperature range.

A disadvantage of the known liquid electrolytes is that the "forming behaviour", i.e. the efficiency with which the forming current builds up the dielectric oxide layer and the compactness of the oxide layer are not optimum. As a result excessive evolution of gas occurs and the leakage current is too large. As a rule, the known liquid electrolytes are not suitable both for high voltage application and for low voltage application, in which it should be taken into account that the level of the specific conductivity required for the voltage range in question must always be adjusted by means of the choice of the concentration of the dissolved ionic materials. In particular for the low voltage capacitors (up to 100 V operating voltage) with high capacitive anode and cathode foils the liquid electrolyte must have a high specific conductivity of at least 5 mS/cm, which is not the case with the known liquid electrolytes. For high voltage capacitors the liquid electrolyte may have a lower specific conductivity, achieved by using a lower concentration of ionic materials in the solvent than for the corresponding low voltage liquid.

The invention provides such a liquid electrolyte.

According to the invention, an electrolytic capacitor comprising an anode provided with a dielectric oxide layer by anodic oxidation, a cathode, a spacer and a liquid electrolyte comprising a salt of a substituted ammonium base and an organic acid in a dipolar organic solvent, is characterized in that the electrolyte liquid comprises a salt of a quaternary ammonium base and a dibasic organic carboxylic acid of the formula HOOC—$(CH_2)_n$—COOH dissolved in a mixture of a dipolar organic solvent and at least 2 but at most 10% by weight of water. The liquid electrolytes in which in the formula defining the bivalent carboxylix acid is defined by $4 \leq n \leq 8$ are preferred.

For use in a high voltage range (100 Volts and higher operating voltage) the liquid electrolyte may have a lower specific conductivity. However, it is an advantage that for both ranges of the operating voltage the same type of liquid electrolyte can be used with only a difference in concentration of the dissolved salt.

According to a preferred embodiment it has been found that a better forming behaviour can be realised in an electrolytic capacitor when the base and the acid in the dissolved salt in the liquid electrolyte are in the base and the acid in the stoichiometric mol ratio 2:1.

As regards the solvent, a carbonamide is preferred in connection with the high specific conductivity obtained herewith. Dependent on the use, a second solvent may be added, for example, another amide, ethylene glycol, γ-butyrolactone or N-methylpyrrolidone.

Optimum results in increasing the breakdown voltage of the capacitor are achieved with a liquid electrolyte which comprises up to 4% by weight of water.

For increasing the breakdown voltage up to 500 V, boric acid and/or a substituted phosphate may also be favorably added to the liquid electrolyte used in a capacitor according to the invention.

A solvent for the electrolyte liquid which can very readily be used in practice is a mixture of N,N-dimethylacetamide and an N-monomethylacetamide in a mol ratio of 4:1. In this mixture the solubility of most salts to be considered (for example, the tetra-ethylammonium salt of azelaic acid) is very great and the conductivity of the liquid is high, not only due to the concentration of dissolved salt, but also due to the choice of the salt and of the solvent. For example, the specific conductivity of the above-mentioned salt in a concentration of 17% by weight in a solvent consisting of 83% by weight of dimethylacetamide and 17% by weight of N-methylacetamide with approximately 2% by weight of water comes to 7.6 mS/cm.

A few liquid electrolytes with their specific conductivities which are recorded in Table 1 below are suitable for use in a high voltage capacitor and for use in a low voltage capacitor. The following abbreviations are used in the table:

DMA = N,N-dimethylacetamide
NMA = N-methylacetamide
DMF = N,N-dimethylformamide
TEA = Tetraethylammonium.

TABLE I

| Solvent | $H_2O$ content wt. % | salt | salt content wt. % | conductivity (mS/cm) at 25° C. |
|---|---|---|---|---|
| DMA | 4.5 | TEA-malonate | 3.7 | 2.4 |
| DMA | 4.5 | TEA-adipate | 3.8 | 2.8 |
| DMA | 2.0 | TEA-adipate | 17.0 | 5.1 |
| DMA | 2.0 | TEA-azelate | 17.0 | 4.5 |
| DMA 83 wt. % / NMA 17 wt. % | 2.0 | TEA-azelate | 17.0 | 7.6 |
| DMF 17 wt. % | 1.5 | TEA-azelate | 23.0 | 9.4 |
| DMA 83 wt. % / NMA 17 wt. % | 1.5 | TEA-azelate | 10.0 | 6.3 |
| DMA 83 wt. % / NMA 17 wt. % | 1.5 | TEA-suberate | 10.0 | 5.3 |
| DMA 83 wt. % / NMA 17 wt. % | 1.5 | TEA-sebacinate | 10.0 | 5.2 |
| DMA 83 wt. % / NMA 17 wt. % | 4.0 | TEA-sebacinate | 1.8 | 1.22 |
| DMA 83 wt. % / NMA 17 wt. % | 4.0 | TEA-sebacinate | 0.68 | 0.85 |
| DMA 83 wt. % / NMA 17 wt. % | 4.0 | TEA-azelate | 1.8 | 1.67 |

For explanation of the invention a few examples will now be described.

In the example the following electrolyte liquids are used:

TABLE 2

| Electrolyte | solvent | Solvent content wt. % | salt | salt content wt. % | addition | add. content wt. % | H₂O content wt. % |
|---|---|---|---|---|---|---|---|
| 1 | DMA | 63.7 | ammonium-pentaborate | 10.1 | boric acid | 5.0 | |
| | glycol | 21.2 | | | | | |
| 2 | DMA | 72.6 | ammonium-pentaborate | 4.1 | picric acid | 7.5 | 4.0 |
| | glycol | 11.8 | | | | | |
| 3 | DMA | 76.3 | TEA-azelate | 3.0 | boric acid | 0.7 | 4.0 |
| | NMA | 16.0 | | | | | |
| 4 | DMA | 76.2 | TEA-azelate | 3.0 | boric acid butyl phosphate | 0.7 0.1 | 4.0 |
| | NMA | 16.0 | | | | | |
| 5 | DMA | 76.5 | TEA-sebacinate | 2.7 | boric acid butyl phosphate | 0.7 0.5 | 4.0 |
| | NMA | 16.1 | | | | | |
| 6 | DMA | 77.6 | TEA-sebacinate | 1.2 | boric acid | 0.7 | 4.0 |
| | NMA | 16.5 | | | | | |
| 7 | DMA | 77.2 | TEA-sebacinate | 1.2 | boric acid butylphosphate | 0.7 0.5 | 4.0 |
| | NMA | 16.4 | | | | | |
| 8 | DMA | 77.7 | TEA-sebacinate | 0.68 | boric acid butyl phosph. | 0.7 0.5 | 4.0 |
| | NMA | 16.4 | | | | | |
| 9 | DMA | 66.0 | TEA-azelate | 17.0 | boric acid butyl phosphate | 0.7 0.5 | 2.0 |
| | NMA | 13.8 | | | | | |
| 10 | DMA | 70.1 | TEA-azelate | 10.0 | boric acid butyl-phosphate | 0.7 0.5 | 4.0 |
| | NMA | 14.7 | | | | | |

DMA=N,N-dimethylacetamide
NMA=N-methylacetamide
glycol=tetraethylammonium/TEA=tetraethylammonium.

No. 1 and No. 2 are examples of usual electrolytes for high voltage electrolytic capacitors having a conductivity of 1.07 mS/cm at 25° C., and for low voltage capacitors having a conductivity of 4.0 mS/cm at 25° C., respectively. In the following experiments they are used as a reference. In Table 3 the forming efficiency of two liquids according to the invention calculated from the current variation during forming with constant voltage, is compared with that of the two reference liquids 1 and 2. At 25° C. this is of substantially the same level, at 85° C., however, the liquids used in capacitors according to the invention are significantly better.

The breakdown voltage is also sufficiently high for use in a high voltage electrolytic capacitor (≦450 V) and in a low voltage electrolytic capacitor (≦150 V).

TABLE 3

| electrolyte liquid No. | forming efficiency (%) 25° C. | forming efficiency (%) 85° C. | breakdown voltage (V) at 85° C. |
|---|---|---|---|
| 1 | 83 | 64 | 460 |
| 6 | 81 | 83 | 470 |
| 2 | 89 | 69 | 85 |
| 9 | 100 | 92 | 180 |

Table 4 illustrates the effect of the addition of boric acid and of boric acid and butyl phosphate on the breakdown voltage at 85° C. to the electrolyte 5.

TABLE 4

| Addition | wt. % | breakdown voltage at 85° C. |
|---|---|---|
| none | — | 160 |
| boric acid | 0.7 | 350 |
| boric acid | 0.7 | 410 |

TABLE 4-continued

| Addition | wt. % | breakdown voltage at 85° C. |
|---|---|---|
| butyl phosphate | 0.5 | |

The resistivity at different temperatures of an electrolyte used in a capacitor according to the invention (3) and of a reference liquid 1 is recorded in Tables. At 25° C., that of 3 is a factor 2.3 lower than that of 1, but at −55° C. the resistivity of 3 is a factor of 22 lower than that of 1.

TABLE 5

| liquid electrolyte No. | Resistivity ρ (Ω cm) at temp. (°C.) | | | | | |
|---|---|---|---|---|---|---|
| | 85 | 25 | 20 | −25 | −40 | −55 |
| 1 | 290 | 935 | 1002 | 8410 | 30700 | 187000 |
| 3 | 170 | 413 | 428 | 1540 | 3150 | 8660 |

Table 6 illustrates the stability of two liquids according to the invention at 125° C. The conventional liquid electrolytes Nos. 1 and 2 are not stable at 125° C., inter alia because glycol esterifies with boric acid.

The resistivity after 1000 hours of the liquid electrolytes 3 and 4 according to the invention has increased only slightly by 11 and 2%, respectively, irrespective of the addition of butyl phosphate.

TABLE 6

| liquid electrolyte No. | Resistivity (ρ 25° C.) in Ω cm after x hours at 125° C. | | | | |
|---|---|---|---|---|---|
| | 0 h | 100 h | 250 h | 500 h | 1000 h |
| 3 | 413 | 441 | 452 | 433 | 457 |
| 4 | 426 | 413 | 402 | 405 | 435 |

Table 7 shows the stability of a series of electrolytic capacitors according to the invention after testing for 100 hours at 85° C. and 105° C. without voltage as compared with that with conventional liquids in % with respect to the starting value. The first three values apply to a high voltage capacitor, the last two to a low voltage capacitor.

TABLE 7

| liquid electrolyte No. | $\Delta Z_{100\ kHz}$ after 100 h at 85° C. O V in % | $\Delta Z_{100\ kHz}$ after 100 h at 105° C. and O V in % |
|---|---|---|
| 1 | −40.2 | −66.3 |
| 3 | −5.6 | |
| 6 | −22.3 | −24.3 |
| 2 | −13.0 | −14.8 |
| 9 | −7.0 | −7.4 |

Finally, a number of liquid electrolytes (see Table 2) in electrolytic capacitors have been subjected to life tests. These capacitors consist of an anode foil of aluminum and a cathode foil both comprising a contact lug and together formed into a roll with a separator of porous paper. The anode foil is etched and then formed by anodic oxidation yp to a voltage which is at least 20% above the operating voltage. The cathode foil is etched only so that the cathode capacitance is much higher than the capacitance of the formed anode foil. The resulting roll is impregnated with the liquid electrolyte and provided in an envelope. The capacitor is post-formed.

Anode foil formed up to 550 V is used in the high voltage electrolytic capacitors according to this example. The capacitors have a diameter of 15 mm and a length of 30 mm. They have been post-formed at 385 V and at 85° C.

Table 8 records the results of the life tests in the form of a number of physical quantities at 0 hours and after 1000 hours at 85° C. and at 385 V, and 500 hours at 105° C. and at 385 V, respectively. The values of the physical quantities are average values measured on 10 capacitors and represent the capacitance (C) at 100 Hz, the equivalent series resistance (esr) at 100 Hz, the impedance (Z) at 100 kHz and the leakage current (LC) after 1 minute, measured at the operating voltage of 385 V and at 25° C.

TABLE 8

| liquid electrolyte No. | 0 h | | | | life at T° C., 385 V | | | | |
|---|---|---|---|---|---|---|---|---|---|
| | C μF | esr mΩ | Z mΩ | LC μA | ΔC % | Δesr % | ΔZ % | LC μA | T °C. |
| 1 | 20.4 | 2916 | 1350 | 71 | 1.3 | −52 | −72 | 5 | 85 |
| | | | | | | −61 | −80 | 12 | 105 |
| 6 | 20.3 | 1973 | 740 | 120 | 1.3 | −5.1 | −24.5 | 5 | 85 |
| | | | | | 1.0 | −14.4 | −32.0 | 15 | 105 |
| 7 | 20.1 | 1837 | 642 | 30 | 1.3 | −9.3 | −28.7 | 3 | 85 |
| 8 | 20.2 | 2701 | 1017 | 238 | 0.8 | −19.8 | −24.6 | 4 | 85 |

The liquid electrolytes 6 and 7 according to the invention have a significantly lower level and variation of the esr and the impedance than the conventional liquid electrolyte 1. Liquid electrolyte 8 may also be used at 400 V and 85° C.

Foil formed up to 120 V is used in the low voltage electrolytic capacitors. The capacitors also have a diameter of 15 mm and a length of 30 mm. They have been post-formed at 100 V and 85° C.

In Table 9 the results are recorded of life tests in the form of the physical quantities already identified above at 0 hours and after 1000 hours at 85° C. and at 100 V and at 125° C. at 63 V. In this case also the indicated values are average values, measured on 10 capacitors. The operating voltages for the leakage current measurment in this case are 100 V and 63 V, respectively.

TABLE 9

| liquid electrolyte No. | 0 h | | | | | life at T° C. and $V_b$ | | | | |
|---|---|---|---|---|---|---|---|---|---|---|
| | C μF | esr mΩ | Z mΩ | LC μA | ΔC % | Δesr % | ΔZ % | LC μA | T °C. | $V_b$ V |
| 9 | 283 | 206 | 70.8 | 200 | −1.7 | 9.2 | −2.6 | 19 | 85 | 100 |
| 10 | 302 | 193 | 104 | 141 | −2.7 | 16.7 | −0.2 | 22 | 85 | 100 |
| 9 | 283 | 206 | 70.8 | 25 | −3.6 | 18.0 | 23.1 | 7 | 125 | 63 |

These liquid electrolytes according to the invention cannot be compared with the conventional liquid (No. 2), since this conventional liquid is unfit at 85° C., 100 V and 125° C., 63 V.

According to a further elaboration of the invention, the choice of the paper of which the spacer is made is of importance for the value of the effect, notably with respect to the impedance Z, which is achieved by the capacitor liquid according to the invention.

Commercially available especially for use as a spacer for electrolytic capacitors are the Manilla paper made of the Manilla fibre and the cellulose paper made of cellulose fibre. These types of paper which are distinguished inter alia by a different porosity aare obtainable, for example, from Messrs. "Schoeller und Hoesch" and and Messrs. Bolleré.

In the following Table 10, two qualities of each of the two types of paper in combination with a few liquids for low voltage and for high voltage applications are compared with each other. A base for mutual comparison is the product resistance factor x paper thickness. This product is
for Manilla paper I 1200
for Manilla paper II 320
for Cellulose paper I 240,
for Cellulose paper II 320.

TABLE 10

| liquid electrolyte No. | ρ25° C. (Ω·cm) | I Manilla II | | I Cellulose II | | forming voltage foil (V) |
|---|---|---|---|---|---|---|
| | | Z (mΩ) | Z (mΩ) | Z (mΩ) | Z (mΩ) | |
| 1 | 910 | 1179 | 418 | 322 | 692 | 120 |
| 1 | 935 | 1350 | — | — | — | 550 |
| 7 | 895 | 546 | 264 | 329 | 557 | 120 |
| 7 | 950 | 642 | — | — | — | 550 |
| 2 | 250 | — | — | 86 | — | 120 |
| 9 | 145 | — | — | 71 | — | 120 |
| 9 | 145 | 97 | 54 | 69 | 109 | 120 |

It appears from this Table that the improvement as a result of the choice of a liquid according to the invention is best obtained with a spacer consisting of Manilla paper.

What is claimed is:

1. An electrolytic capacitor comprising an anode provided with a dielectric oxide layer by anodic oxidation, a cathode, a spacer and a liquid electrolyte comprising a salt of a substituted ammonium base and an organic acid in a dipolar organic solvent, characterized in that the electrolyte comprises a salt of a quaternary ammonium base and a dibasic organic carboxylic acid HOOC—$(CH_2)_n$—COOH wherein $4 \leq N \leq 8$ dissolved in a mixture of a dipolar organic solvent and at least 2% but at most 10% by weight of water.

2. A capacitor as claimed in claim 1, characterized in that the dissolved salt in the liquid electrolyte comprises the base and the acid in the stoichiometric mol. ratio 2:1.

3. A capacitor as claimed in claim 2, characterized in that the liquid electrolyte comprises at least 2, but at most 4% by weight of water.

4. A capacitor as claimed in claim 2, characterized in that the liquid electrolyte comprises boric acid.

5. A capacitor as claimed in claim 2, characterized in that the liquid electrolyte comprises a dissolved phosphate.

6. A capacitor as claimed in claim 1, characterized in that the liquid electrolyte comprises at least 2, but at most 4% by weight of water.

7. A capacitor as claimed in claim 1, characterized in that the liquid electrolyte comprises boric acid.

8. A capacitor as claimed in claim 1, characterized in that the liquid electrolyte comprises a dissolved phosphate.

9. A capacitor as claimed in claim 1, characterized in that the spacer consists of Manilla paper.

10. A capacitor as claimed in claim 1, characterized in that the solvent in the liquid electrolyte consists of a mixture of N-dimethyl-acetamide and N-monomethylacetamide in a mol. ratio of 4:1.

11. A capacitor as claimed in claim 1, characterized in that the dissolved salt in the liquid electrolyte comprises the base and the acid in the stoichiometric mol. ratio of 2:1.

12. A capacitor as claimed in claim 1, characterized in that the liquid electrolyte comprises at least 2, but at most 4% by weight of water.

13. A capacitor as claimed in claim 1, characterized in that the liquid electrolyte comprises boric acid.

14. A capacitor as claimed in claim 1, characterized in that the liquid electrolyte comprises a dissolved phosphate.

15. A capacitor as claimed in claim 1, characterized in that the spacer consists of Manilla paper.

16. A capacitor as claimed in claim 1, characterized in that the solvent in the liquid electrolyte consists of a mixture of N-dimethyl-acetamide and N-monomethylacetamide in a mol. ratio of 4:1.

* * * * *

UNITED STATES PATENT AND TRADEMARK OFFICE
CERTIFICATE OF CORRECTION

PATENT NO. : 4,473,864

DATED : September 25, 1984

INVENTOR(S) : TINEKE VAN HEUSDEN

It is certified that error appears in the above-identified patent and that said Letters Patent is hereby corrected as shown below:

Column 7, line 13, "N" should be --n--.

Signed and Sealed this

Second Day of April 1985

[SEAL]

Attest:

DONALD J. QUIGG

Attesting Officer     Acting Commissioner of Patents and Trademarks